June 6, 1933.   I. H. SCOTT   1,913,248
WINDOW WASHING DEVICE
Filed Feb. 11, 1932
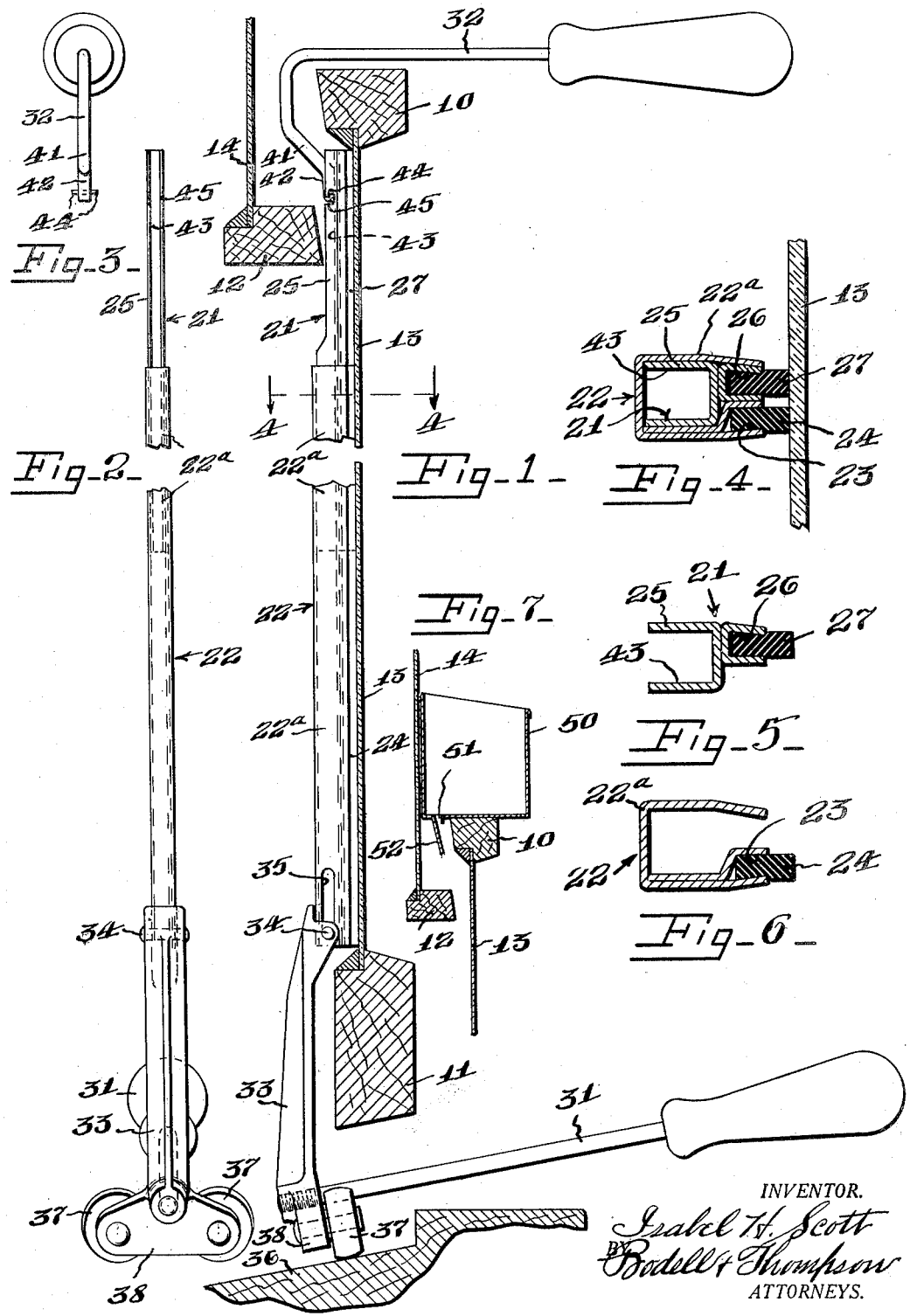
INVENTOR.
Isabel H. Scott
BY Bodell & Thompson
ATTORNEYS.

Patented June 6, 1933

1,913,248

UNITED STATES PATENT OFFICE

ISABEL H. SCOTT, OF SYRACUSE, NEW YORK

WINDOW WASHING DEVICE

Application filed February 11, 1932. Serial No. 592,333.

This invention has for its object, a device for washing the outsides of windows from the inside of a building, which means is particularly simple and economical in construction, readily operable, and highly efficient in use.

The invention consists in the novel features and in the combinations and constructions hereinafter set forth and claimed.

In describing this invention, reference is had to the accompanying drawing in which like characters designate corresponding parts in all the views.

Figure 1 is an elevation of this window washing device, partly broken away, the same being shown as applied to the lower sash of a window, which is shown in section, a fragment of the upper sash being also shown in section.

Figure 2 is an elevation of this device, looking to the right in Figure 1, the window sashes being omitted, and the upper handle as detached.

Figure 3 is an end view of the upper handle looking to the right in Figure 1.

Figure 4 is an enlarged, sectional view on line 4—4, Figure 1.

Figures 5 and 6 are respectively, cross sectional views through the upper and lower wipers.

Figure 7 is a fragmentary, sectional view through the upper and lower sashes with the lower sash partly raised showing the means for applying the washing fluid to the outer side of the sash preliminary to applying the wiper.

This window wiper comprises a wiper member having handles at its upper and lower end extending at an angle thereto in order to extend across the upper and lower rails of the sash when the wiper is applied thereto, so that the wiper can be drawn across the window pane draw shave fashion from the inside of the window.

As here illustrated, the wiper is composed of two sections adjustable lengthwise of each other in order to adjust the wiper to the height of the glass pane between the upper and lower top rails of the sash.

10 and 11 designate respectively the top and bottom rails of a lower sash, and 12 the bottom rail of the upper sash, the top rail of the upper sash not being shown.

13 and 14 designate respectively, the glass panes of the lower and upper sashes.

21 and 22 designate respectively the sections of the wiper member, these being arranged in lapping relation, and one being shown as telescoping within the other. The lower wiper member 22 comprises a holder or back 22ª channel shaped in general form, and formed with a smaller channel 23 at one side of the mouth of the channel for receiving a wiper member 24 of a yielding material, as rubber, or any other suitable wiping material.

25 designates the holder, or back of the upper section 21 of the wiper, this slidably fitting within the channel 22ª and carrying another channel 26 for receiving a wiper member 27, the channel 26 extending into the mouth of the channel 22ª at one side of the channel 23, as seen in Figure 4.

Owing to this construction, the sections 21 and 22 may be adjusted endwise relatively to each other, so that the wiper members will engage the glass pane 13 the entire height thereof between the top and bottom rails.

31 and 32 designate respectively, the handles, one of which, as the upper handle 32 is readily detachable, and the other of which, as 31 is shiftably connected to the lower wiper section 22. The handle 31 is here shown as rigidly carried by a carriage 33 extending lengthwise of the wiper section 22 and forming an extension at the lower end thereof, the carriage 33 being shiftably connected to the section 22. As here illustrated, it is connected at 34 to the lower end of the section 22 to shift lengthwise within limits of the section 22. It is here illustrated as connected to the lower end of the wiper section 22 by a pin and slot connection, the slot being designated 35. Any pivotal movement is prevented by a stop joint so that the handle carriage 33 is slidably connected to the wiper section 22 to shift lengthwise thereof. Usually the carriage is provided with means for running along the windowsill 36 especially when the lower sash is being wiped, this means being here shown as one or more rollers 37 mounted in a roller carriage 38 at the lower end of the carriage 33.

The upper handle 32 and the upper end of the wiper section 21 are provided with readily engageable and disengageable interlocking means and as here shown, the handle 32 is provided with an angular portion 41 at its outer end having a shank 42 for seating in a channel or groove 43 formed in the outer side of the wiper section 21, the shank 42 being provided with lugs or shoulders 44 for interlocking with slots 45 formed in the opposite walls of the channel 43, these slots being angular so that the lugs or shoulders interlock therewith with a bayonet joint action.

The washing fluid may be applied to the outer side of the window in any suitable manner, but I prefer to utilize a trough 50 adapted to rest upon the rail of the sash, the trough having an outlet 51 and a deflector 52 depending from its bottom adjacent the outlet. The trough is placed upon the upper rail of the sash to be washed, and the washing fluid poured thereinto. The fluid runs out through the outlet 51 which is a slot extending the full width of the trough against the deflector, and is directed against the outer face of the glass pane. The trough is slid along the upper rail while the water or fluid is running out, so that the entire outer glass pane of the sash is flushed. The trough is then removed.

Assuming that the lower sash is being washed, the upper handle 32 is detached and the wiper applied to the outer side of the window by passing the upper end under the bottom rail and then up between the sashes. The upper handle 32 is then attached to the upper end of the wiper section 21. This is easily done owing to the angular end 41 and the bayonet joint, before described. The roller 32 may or may not run along the sill. The wiper is then drawn, by means of the handles 31 and 32, draw shave fashion across the window pane and back. The upper handle is then detached, and the wiper removed. The upper sash is then drawn down to a position where it is opposite, or nearly opposite, the lower sash when the lower sash is raised slightly, and the operation repeated, except that it may not be necessary to detach the upper handle 32 when applying the device to the upper sash, as the detachable handle feature is necessary primarily in washing the lower sash where the upper end of the wiper passes between the sashes.

This window washing device is particularly advantageous in that not only are the windows easily washed by the householder from the inside of the room, but also that it is simple in construction and extremely economical to manufacture.

What I claim is:

1. In a window washing device, the combination of a pair of lapping wiper sections slidably connected to each other so as to be adjustable lengthwise relatively to each other to conform to the height of the glass pane of a window and handles attached to the free ends of the wiper sections respectively and extending substantially at right angles thereto, one handle being located to extend under the lower rail of a sash, and the other handle over the upper rail of the sash.

2. In a window washing device, the combination of a pair of lapping wiper sections slidably connected to each other so as to be adjustable lengthwise relatively to each other to conform to the height of a window pane, and handles attached to the free ends of the wiper sections respectively and extending in substantially at right angles thereto, one handle being located to extend under the lower rail of a sash, and the other handle over the upper rail of the sash, the upper handle and the upper end of the upper wiper having means for detachably engaging.

3. In a window washing device, the combination of a pair of lapping wiper sections slidably connected to each other so as to be adjustable lengthwise relatively to each other to conform to the height of a window pane, and handles attached to the free ends of the wiper sections respectively and extending substantially at right angles thereto, one handle being located to extend under the lower rail of a sash, and the other handle over the upper rail of the sash, a carriage for one of the handles, said carriage being connected to the adjacent wiper section to shift lengthwise thereof, said carriage extending in a general direction lengthwise of said wiper section beyond the end of the same.

4. In a window washing device, the combination of a pair of lapping wiper sections slidably connected to each other so as to be adjustable lengthwise relatively to each other to conform to the height of a window pane, and handles attached to the free ends of the wiper sections respectively and extending substantially at right angles thereto, one handle being located to extend under the lower rail of a sash, and the other handle over the upper rail of the sash, a carriage for one of the handles, the carriage being connected to one end of one of the wipers by a pin and slot connection with the pin extending transversely of the wiper section and the slot lengthwise thereof, said carriage extending in a general direction lengthwise of said wiper section beyond the end of the same and the handle being connected to the outer end of the carriage.

5. A window washing device comprising a pair of wiper sections arranged in lapping relation to each other and including wiper holders, one telescoping within the other, and handles connected to the free ends of the wiper holders respectively.

6. A window washing device comprising a pair of wiper sections arranged in lapping relation including holders, one telescoping within the other, and handles at the outer ends of the holders respectively, one of the holders being is the form of a large channel having a smaller channel adjacent one side of the mouth thereof for holding one wiper member and the other holder telescoping within the larger channel of said first holder, and being provided with means extending through the mouth of the larger channel for holding a wiper member.

7. A window washing device comprising wiper sections slidably connected to each other so as to be adjustable lengthwise relatively to each other, and having handles extending at their free ends extending at an angle thereto, a carriage for the lower handle extending in a general direction lengthwise of the adjacent wiper section and connected to the lower end thereof to have a movement lengthwise of the said lower section, the upper handle and the upper wiper section having coacting means forming a bayonet joint.

8. In a window washing device, the combination of a substantially rigid wiper, and handles at the upper and lower ends of the wiper and rigid therewith with respect to the operative movement of the wiper, whereby force applied to the handles draws the wiper as a unit with the handles, said handles extending at an angle thereto in position to extend across the upper and lower bottom rails of a sash when the wiper is applied to the outer side of the glass pane, whereby the device is operable draw shave fashion across the pane.

In testimony whereof, I have hereunto signed my name, at Syracuse, in the county of Onondaga, and State of New York, this 28th day of December, 1931.

ISABEL H. SCOTT.